June 13, 1967  D. E. MARSHALL  3,325,055
LIVESTOCK FEEDER
Filed June 14, 1965  5 Sheets-Sheet 1
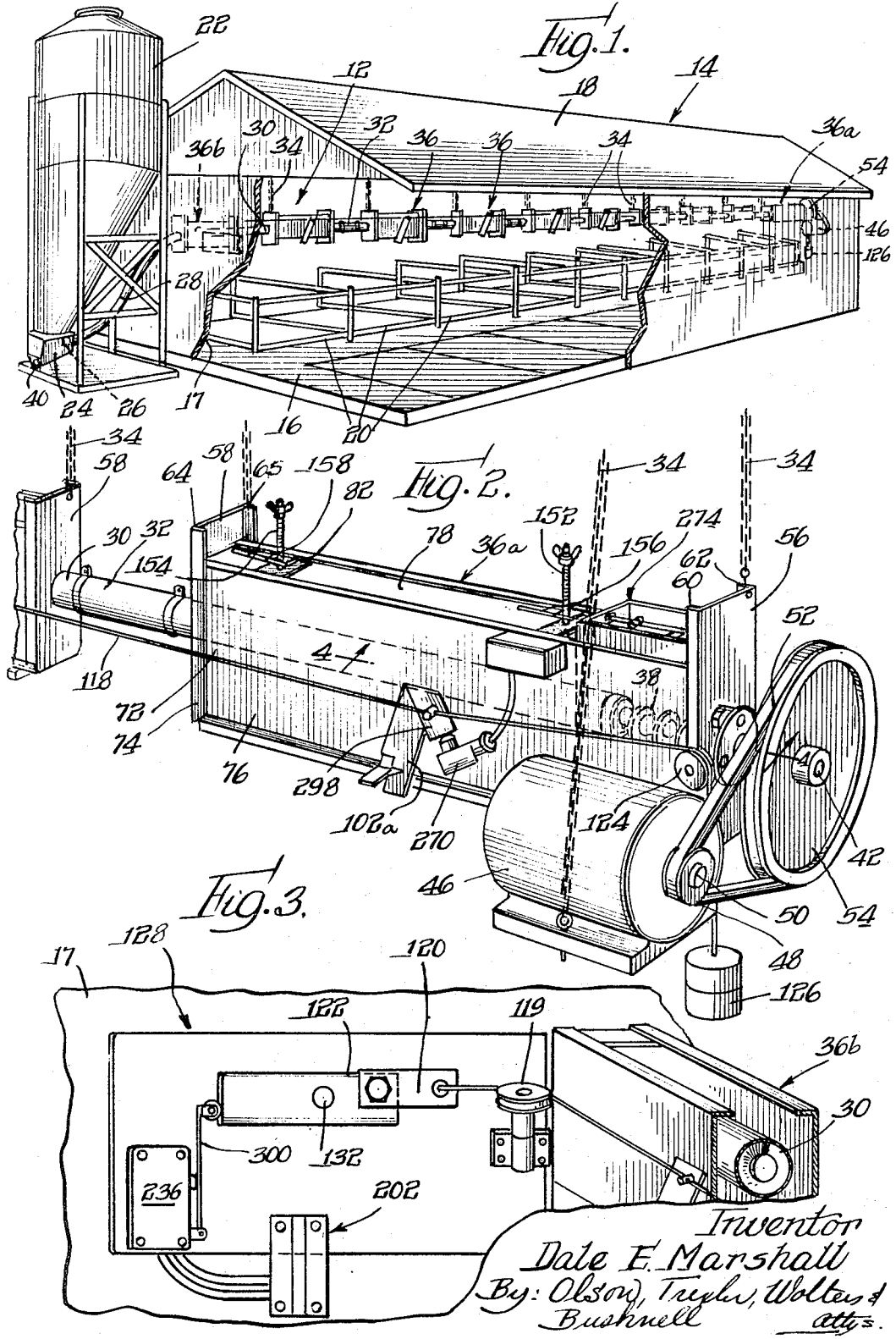
Inventor
Dale E. Marshall
By: Olson, Trexler, Wolters & Bushnell
Attys.

June 13, 1967
D. E. MARSHALL
3,325,055
LIVESTOCK FEEDER
Filed June 14, 1965
5 Sheets-Sheet 2
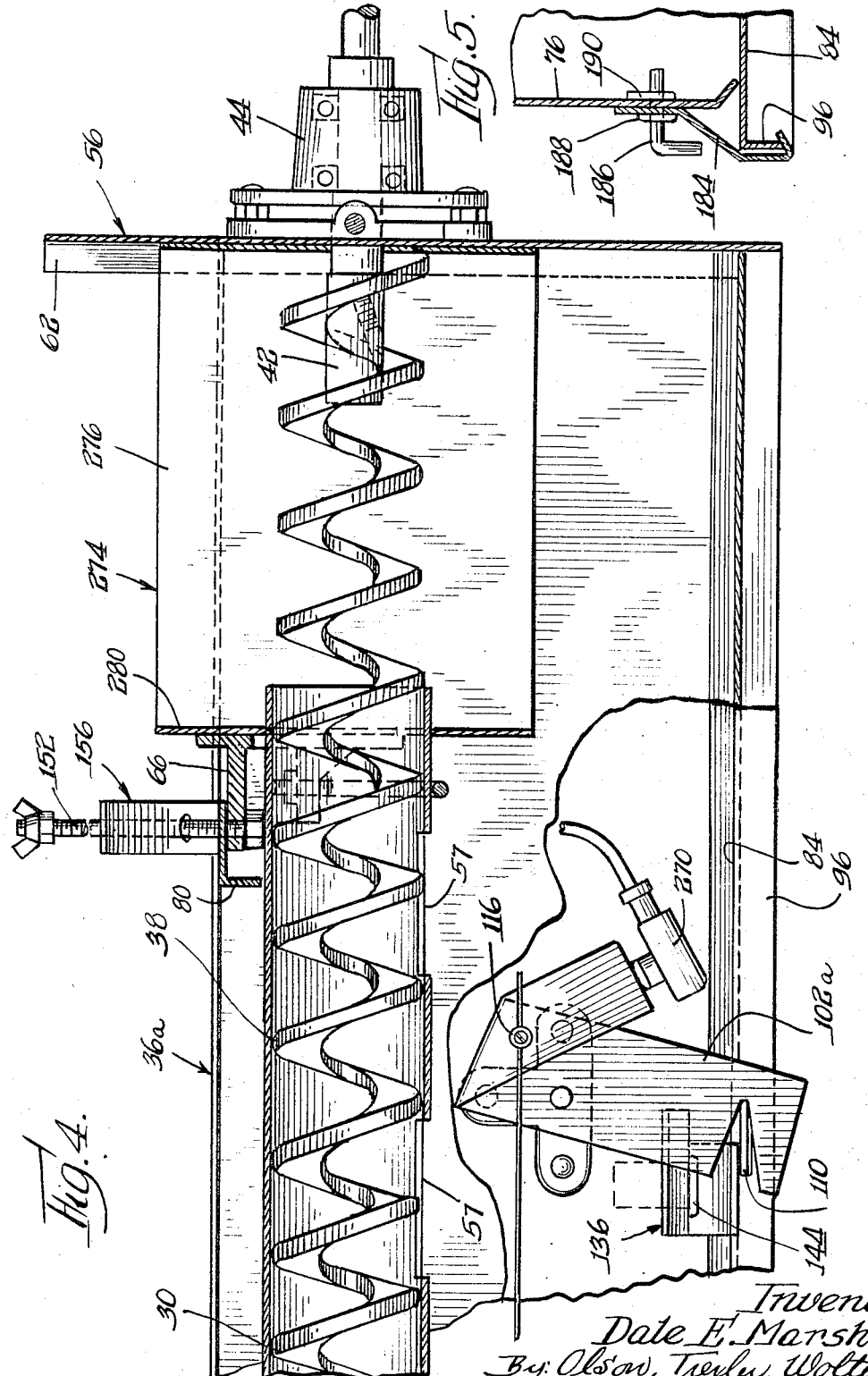
Inventor
Dale E. Marshall
By: Olson, Trexler, Wolters &
Bushnell. Attys.

June 13, 1967  D. E. MARSHALL  3,325,055
LIVESTOCK FEEDER
Filed June 14, 1965  5 Sheets-Sheet 3
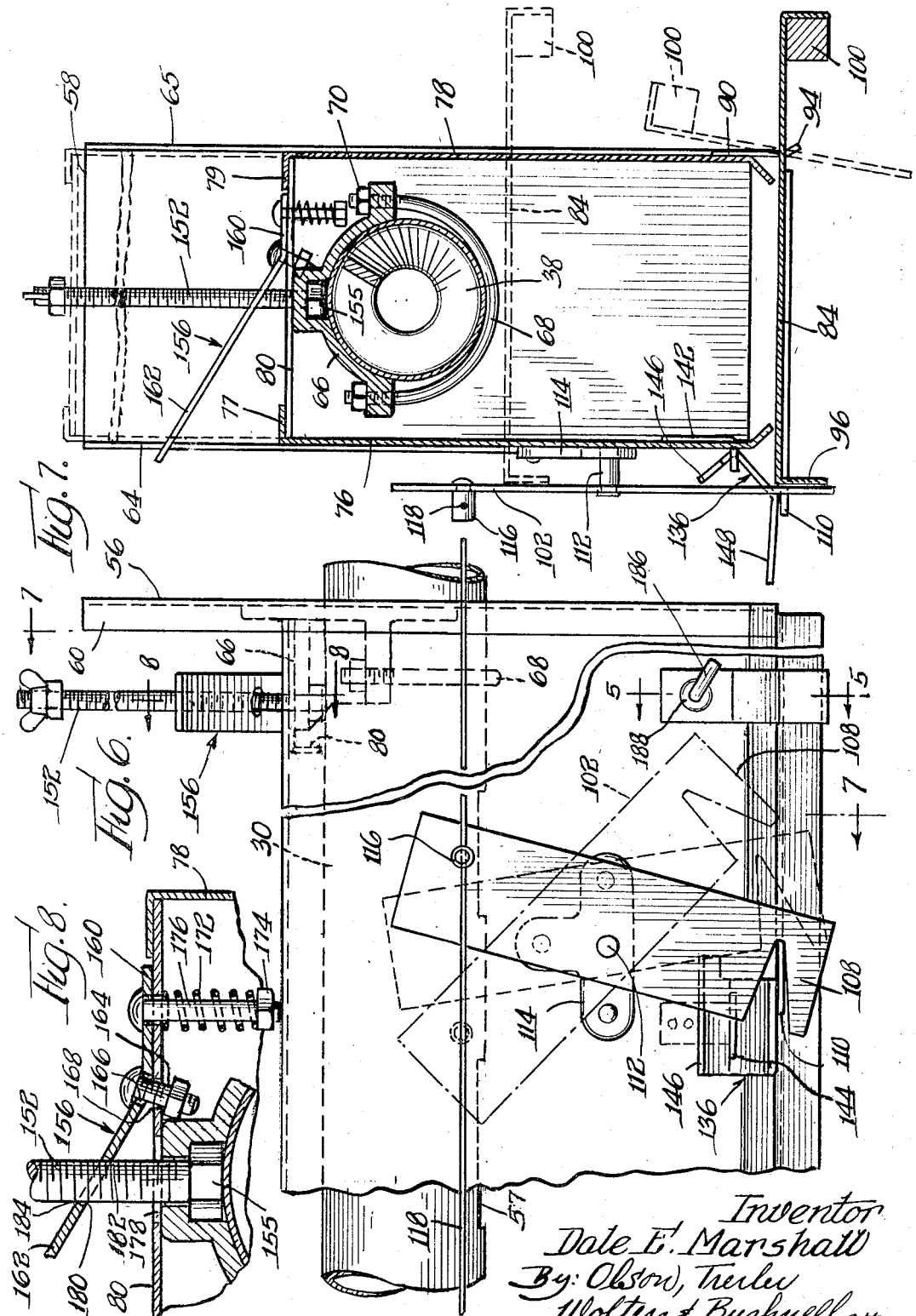
Inventor
Dale E. Marshall
By: Olson, Trexler,
Wolters & Bushnell attys.

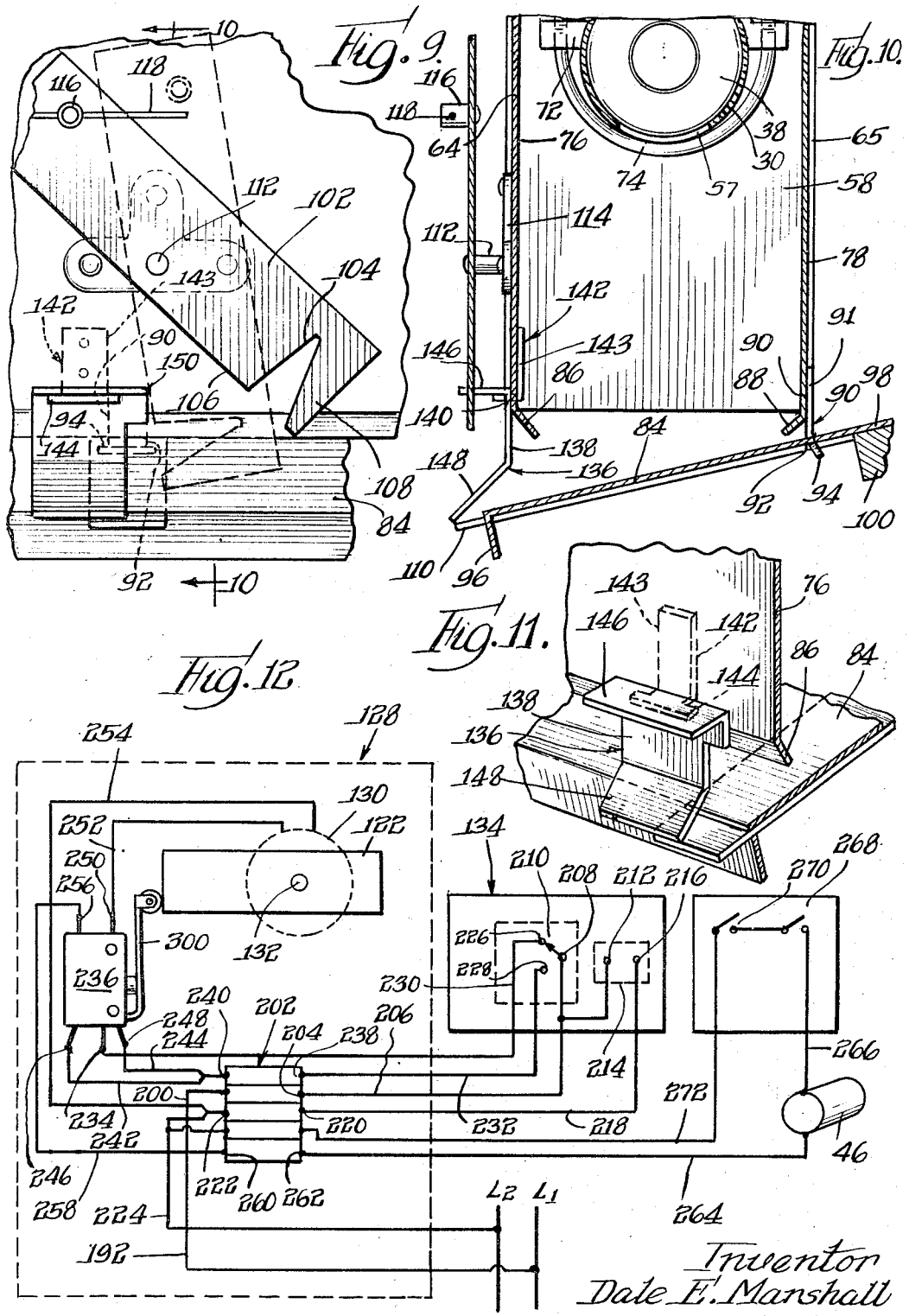

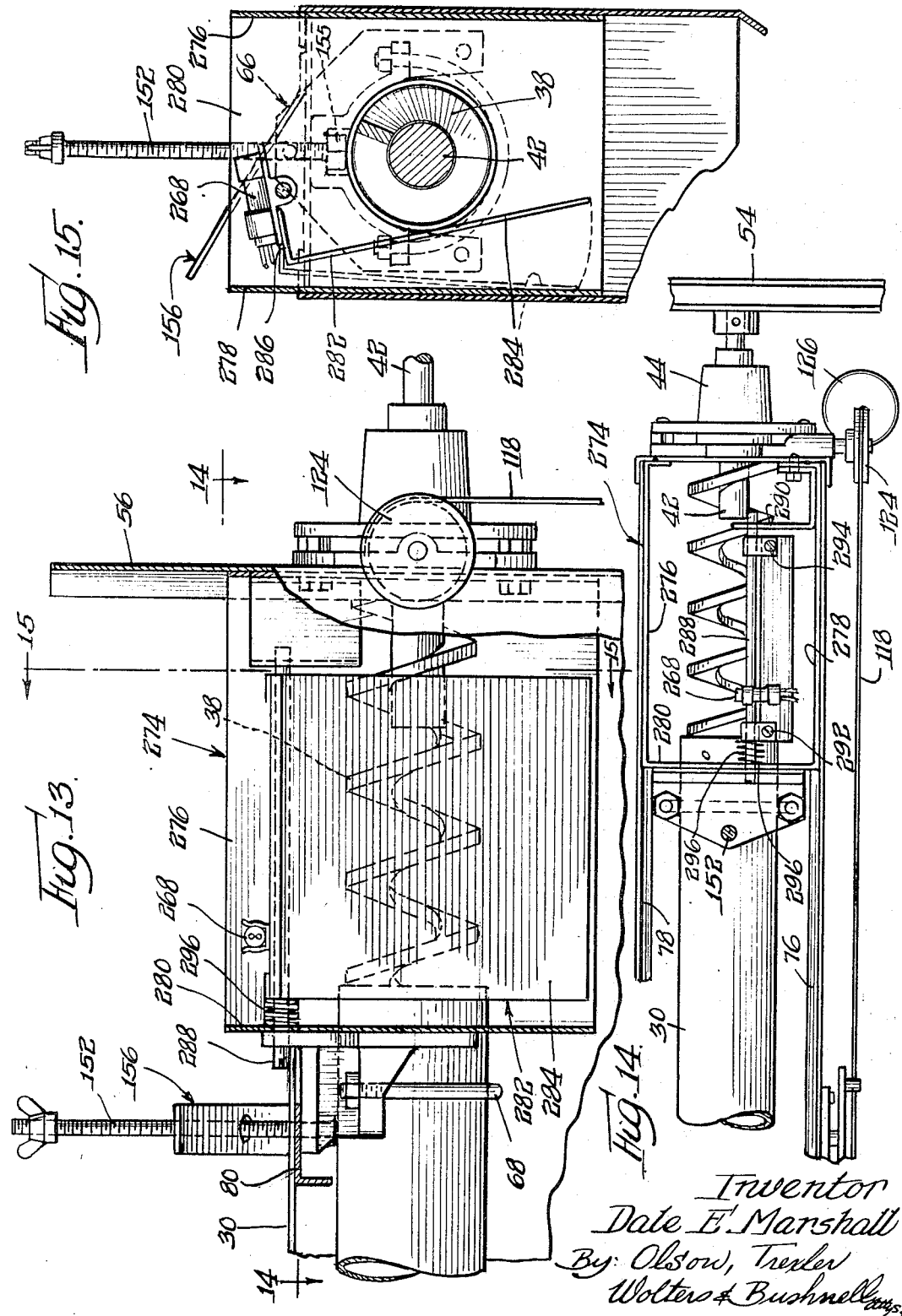

United States Patent Office 3,325,055
Patented June 13, 1967

3,325,055
LIVESTOCK FEEDER
Dale E. Marshall, Milford, Ind., assignor to Chore-Time Equipment, Inc., Milford, Ind., a corporation of Indiana
Filed June 14, 1965, Ser. No. 463,576
22 Claims. (Cl. 222—70)

The present invention relates to a novel feeder apparatus, and more specifically a novel apparatus for feeding livestock.

It has been suggested that livestock such as hogs be fed predetermined or limited amounts of feed at specified intervals in a manner for obtaining increased efficiency of feed conversion and improvement in the quality of the animals. It is an object of the present invention to provide a novel livestock feeder apparatus which is economical to manufacture and install and efficient in operation.

Another object of the present invention is to provide a novel feeder apparatus capable of delivering feed from a single storage bin and dispensing or dumping the feed in predetermined increments or quantities at a plurality of separate locations and over a predetermined area or pattern at such locations.

A more specific object of the present invention is to provide a novel apparatus of the above described type wherein the amount of feed dispensed at a particular location may be adjusted without substantially changing the area or pattern over which the feed is dispensed at such location.

A further object of the present invention is to provide a novel feeder apparatus of the above described type including a plurality of dispensing or dumping units supported over animal pens or predetermined areas in a manner so as to prevent obstruction of floor space and prevent injury to or contamination of the units by the animals.

Still another object of the present invention is to provide a novel feeder apparatus having a plurality of dispensing or dumping units and constructed for automatically filling and opening said units and for preventing filling in the event of a malfunction which prevents closing of one or more of the units.

Other objects and advantages of the present invention will become apparent from the following description and the accompanying drawings wherein:

FIG. 1 is a simplified perspective view showing a feeder apparatus incorporating features of the present invention;

FIG. 2 is an enlarged fragmentary perspective view showing a downstream end portion of a feeder apparatus incorporating features of the present invention;

FIG. 3 is a fragmentary elevational view showing a portion of an actuating mechanism incorporated in the apparatus of the present invention;

FIG. 4 is an enlarged fragmentary sectional view taken generally along line 4—4 in FIG. 2;

FIG. 5 is a fragmentary sectional view taken generally along line 5—5 in FIG. 6;

FIG. 6 is a fragmentary side elevational view showing a portion of one of the dispensing or dumping units incorporated in an apparatus of the present invention;

FIG. 7 is a sectional view taken along line 7—7 in FIG. 6;

FIG. 8 is an enlarged fragmentary sectional view taken along line 8—8 in FIG. 6;

FIG. 9 is a fragmentary side elevational view showing a manner in which a latch mechanism included in the dispensing or dumping unit functions;

FIG. 10 is a sectional view taken along line 10—10 in FIG. 9;

FIG. 11 is a fragmentary perspective view of a portion of the latch mechanism shown in FIGS. 6, 9 and 10;

FIG. 12 is a schematic diagram showing a control system incorporated in the apparatus of the present invention;

FIG. 13 is a fragmentary elevational view partially broken away showing a portion of the structure for controlling filling of the dispensing or dumping units;

FIG. 14 is a sectional view taken along line 14—14 in FIG. 13; and

FIG. 15 is a fragmentary sectional view taken along line 15—15 in FIG. 13.

Referring now more specifically to the drawings wherein like parts are designated by the same numerals throughout the various figures, a feeder apparatus 12 incorporating features of the present invention is shown in FIG. 1. The apparatus is conveniently installed in association with a building or other animal shelter 14 having a floor 16, a wall 17, a roof 18 and a plurality of animal pens 20. It is, of course, understood that the construction of the building and the arrangement of the animal pens may be modified as desired.

The apparatus 12 comprises a bulk bin 22 or other source of animal feed. The bulk bin 22 may conveniently be located outside of the walls 17 of the building 14. The bulk bin 22 has a fitting or boot 24 at its lower end providing a discharge opening 26 which is connected with a tube 28 extending upwardly from the lower end of the bin to a level above the animal pens 20. The tube 28 is curved so as to extend from the upwardly inclined bottom of the boot 24 for connection with a substantially horizontally extending straight tube 30 disposed over the animal pens 20. The tube 30 may be made up from a plurality of sections axially connected by suitable sleeve or coupling means 32 and is supported from the roof or ceiling of the building 14 by cables, chains, or other suitable hanger elements 34. Dispensing or dumping units 36 are mounted on the tube 30 at spaced intervals and over the individual animal pens 20.

In order to transfer the feed from the lower end of the bulk bin 22 to each of the dispensing or dumping units 36, an elongated helical auger 38 extends throughout the length of the tube 30. The auger is preferably in the form of a centerless flexible and resilient helical spring like member so that it is adapted to extend through the curved portions of the tube 28 or around any other curves or corners which may be necessary or desirable to provide in the tubing for a particular installation.

The spring auger 38 extends continuously from the lower fitting or boot 24 on the bulk bin and a suitable bearing unit 40 is mounted in an end wall of the boot and is secured to and rotatably anchors the upstream end of the auger. The downstream end of the auger is shown best in FIG. 4 and is secured and anchored to a driveshaft 42 which is rotatably supported by a bearing unit 44. The normal length of the spring auger 38 is correlated with the distance between the anchor unit 40 and the driveshaft 42.

The driveshaft 42 is connected with a suitable prime mover such as an electric motor 46 through speed reducing means. In the embodiment shown, the speed reducing means comprises a small pulley 48 fixed on the motor shaft 50 and driving an endless belt 52 which encircles a large pulley 54 on the driveshaft 42. It is to be understood that any suitable power transmitting means or speed reducing gear unit could be used.

When the motor 46 is energized, the helical spring auger 38 is rotated so that feed is drawn from the fitting or boot 24 at the bottom of the bin 22 upwardly through the tube 28 and along the length of the tube 30. Openings 57 are provided in the bottom of the tube 30 at spaced intervals and in alignment with each of the dispensing or dumping units 36. The openings 57 may be in the form of elongated slots respectively extending for substantially the full length of their associated dumping or dispensing units 36. Alternatively, the openings 57 may be in the form of a plurality of spaced apertures or short slots and the like extending for substantially the length of their respective associated dumping units. Thus as the feed is drawn through the tube 30, portions of the feed fall through the successive openings 57 so that the dispensing or dumping units 36 are progressively filled. As each unit 36 becomes filled, the level of the feed therein rises sufficiently to block the opening 57 associated therewith for preventing excessive filling. When the endmost unit 36a at the downstream end of the tube 30 is filled, control means described below function to deenergize the motor 46.

The several dispensing or dumping units 36 and the endmost unit 36a are basically identical so that the same reference numerals are applied to corresponding elements. However, the unit 36a incorporates certain modified structural features related to the control means for the apparatus as will be described below.

Each of the dispensing or dumping units comprises an elongated box or container including opposite end members 56 and 58 having apertures therethrough for receiving the tube 30. The apertures are located in the end members so that substantial portions of the end members extend both above and below the tube. The end member 56 includes inwardly extending marginal flanges 60 and 62 along its opposite vertically disposed edges and the end member 58 includes corresponding inwardly extending marginal flanges 64 and 65.

As shown in FIGS. 2, 4, 6 and 7 a bracket or saddle 66 is welded or otherwise secured to an inner face of the end member 56 for overlying the tube 30. A U-bolt 68 and complementary nuts 70 are provided for securing the saddle and thus the end member 56 with respect to the tube. An identical saddle 72 and U-bolt fastener 74 are connected with the end member 58 as indicated in FIG. 10 for clamping engagement with the tube.

Each of the dispensing or dumping units further comprises oppositely longitudinally extending side walls 76 and 78 having inturned flanges 77 and 79 at their upper margins which are interconnected by transverse frame members 80 and 82. Opposite ends of the side wall 76 are slidably disposed within the upstanding flanges 60 and 64 of the end members and opposite ends of the side wall 78 are similarly slidably disposed within the end flanges 62 and 65.

The container or box structure of each dumping unit is provided with a bottom member or plate 84 which is hingedly connected to a lower marginal portion of the side wall 78. As shown best in FIGS. 7 and 10, the bottom member 84 extends between and beneath inturned and downwardly inclined lower marginal portions 86 and 88 of the side walls 76 and 78. Hinge elements 90 are disposed at spaced locations along the side wall 78 and are welded or otherwise secured thereto. The hinge elements 90 have an inverted T-shaped configuration with the upstanding stems 91 thereof extending through apertures or slots 92 in the bottom member or plate 84 and welded or otherwise secured to the side panel 78. The lower or cross end portions 94 of the inverted T-shaped hinge members project beyond the ends of the slots 92 as shown in FIGS. 9 and 10 for retaining the bottom member for pivotal movement between the open position shown in broken lines in FIG. 7, the partially closed position shown in FIG. 10 and the fully closed position shown in full lines in FIG. 7.

A forward marginal portion of the bottom member 84 is formed with a down turned strengthening and rigidifying flange 96. An opposite marginal portion 98 of the bottom member projects substantially outwardly from the hinge element 90 and carries a counterbalancing weight 100. The arrangement is such that the weight 100 is sufficient to more than counterbalance the weight of the portion of the bottom member projecting from the left side of the hinge elements 90 as viewed in FIGS. 7 and 10, so that the weight causes the bottom member or door normally to swing to and remain in the fully closed position shown in solid lines in FIG. 7.

The feed introduced into each of the dispensing or dumping units 36 falls onto the bottom member 84. The weight of the feed will overcome the counterbalancing weight 100 and bias the bottom member or door toward the open position. Therefore, latch means is provided for releasably securing the door in the closed position until it is desired to dispense the feed. As shown in FIGS. 6, 7, 9, 10 and 11, the latch means comprises a pivotally supported latch member 102 having a notch 104 in an edge 106 thereof providing a hook portion 108 adapted to engage beneath a finger element 110 secured to and projecting forwardly from the bottom member 84. The latch member 102 is mounted on a pivot pin 112 projecting from a bracket 114 which is riveted or otherwise secured to the side panel 76.

An upwardly extending end portion of the latch member 102 is connected by means of a fastener 116 to an actuating element 118. In the embodiment shown, the actuating element is in the form of an elongated cable which is connected to each of the latch members of each of the dumping or dispensing units. One end of the actuating element or cable 118 extends around a guide pulley 119 and is connected by a link 120 with an actuating crank 122 shown in FIG. 3 and to be described more in detail below. The crank 122 is mounted in association with actuating mechanism on the wall 17 or other suitable support adjacent at endmost unit 36b at the upstream end of the tube 30. An opposite end portion of the cable 118 extends around a pully 124 mounted in association with the downstream end dispensing unit 36a. A counter weight 126 or other suitable biasing means is connected to the balancing end of the cable 118 for normally biasing the latch members to the door latching position shown in solid lines in FIGS. 4 and 6.

The actuating lever or crank 122 is a part of a control unit 128 mounted adjacent the dispensing unit 36b and shown in part in FIG. 3 and schematically in FIG. 12. The control unit includes a motor drive 130 of known construction having an output shaft 132 on which the actuating crank 122 is fixed. A switch-clock 134 is included in tht unit 128 for controlling starting of the motor 130 as will be described more in detail below. In general it may be stated that at a predetermined or preset time, the motor unit is energized for rotating the crank member 122 from the position shown in FIGS. 3 and 12 so that the crank serves to pull the cable 118 and thereby pivot the latch members 102 to door releasing positions. Then when the motor 130 is deenergized, the weight 126 pulls the cable 118 so as to return the latch members toward the door locking positions.

As previously indicated, after the feed has been dumped from the dispensing unit, the bottoms or doors 84 are returned toward closed positions by the counter weights 100. In the event one or more of the bottoms or doors becomes jammed or fails to return to its closed position for any reason, means is provided for preventing the auger motor from being energized and thereby preventing feed from being continuously dumped onto the floor beneath a dispensing unit with the open door. This means comprises a stop element 136 associated with each of the latch members 102 for preventing the latch members from shifting toward the latching positions until their associated doors have been fully closed. In addition safety switch means described more fully below is provided for sensing the position of the latch members 102 and preventing energization of the conveyor or auger motor until all of the latch members are in the closed position.

The structure of the stop elements 136 is shown best in FIGS. 6, 7, 9, 10 and 11. More specifically, each stop element 136 comprises a sheet metal member having a generally upstanding body portion 138 with a slot 140 therein through which a hinge element 142 having an inverted generally T-shaped configuration extends. The hinge element 142 is generally similar to the previously mentioned hinge element 90 and includes an upstanding stem portion 143 welded or otherwise fixed to an associated side wall 76 and a transversely extending lower end portion 144 projecting beyond opposite ends of the slot 140 in the body 138 and thereby retaining the stop member 136. The stop member has a laterally extending flange 146 projecting from an upper margin of the body 138 and a downwardly and outwardly inclined section 148 extending from a lower margin of the body 138.

Referring particularly to FIGS. 6 and 7 it is seen that when the bottom or door member 84 is in its fully closed position, the finger element 110 of the latch mechanism carried by the door member engages the lower end portion 148 of the stop member and supports the stop member in a position so that the upper flange 146 is inclined upwardly and is, in effect, retracted so as to avoid interference with the latch member 102. Upon opening of the door member 84, the stop member 136 freely swings to the position shown in FIGS. 9, 10 and 11 so that the flange 146 projects horizontally for interfering with the latch member 102. Then when the latch member attempts to return from its retracted door releasing position shown in the solid lines in FIG. 9, the edge 106 of the latch member engages an edge 150 of the flange 146 as shown in broken lines in FIG. 9. The latch member 102 is thus retained in the broken line position of FIG. 9 until the door 84 swings from its fully opened position up through the position shown in FIG. 10 for engaging the stop member and lifting or swinging it to the retracted position shown in FIGS. 6 and 7.

Each of the dispensing or dumping units 36 has a predetermined width and length and the bottom or door member 84 extends for substantially the entire length and width of the unit. Thus it is apparent that when a door member 84 is fully opened as shown in FIG. 7 the feed will be dropped onto the floor in a pattern corresponding to the length and width of the unit. It is desirable that this pattern be maintained so that all of the animals within a given pen beneath a dispensing unit will have an adequate opportunity to obtain a share of the feed. At the same time it is desirable to permit the apparatus to be adjusted for varying the amount of feed which is dumped at any one time.

In accordance with a feature of the present invention the dumping or dispensing units 36 are constructed so that the amount of feed may be varied or adjusted without substantially changing the pattern or area over which the feed is dumped. This is accomplished by changing the volume of the container or box structure of each dumping unit beneath the tube 30 without changing the size of the dispensing opening at the bottom of the box. More specifically, the side panels 76 and 78 along with the bottom member hingedly connected thereto are vertically adjustable as a unit relative to the tube 30.

As previously indicated, the opposite end members 56 and 58 are fixed with respect to the tube 30. Upstanding rods or bolt-like standards 152 and 154 having helical threads thereon and heads 155 extend upwardly and freely through apertures in the brackets or saddles 66 and 72 associated with the opposite end members of the box structure with the bolt heads disposed between the saddles and the tube 30 in a manner such that the bolts or rods may be rotated. Hanger members 156 and 158 are connected with the side panels and adjustably engage the upstanding rods or standards 152 and 154 as shown in FIGS. 2, 4, 6, 7 and 8. The hanger members 156 and 158 are respectively connected with the transverse frame members 80 and 82 and thus to the side panels. Since the structures are identical only the hanger member 156 need be shown and described in detail.

Referring particularly to FIGS. 6, 7 and 8 it is seen that the hanger member 156 is in the form of a strap having a first end portion 160 resting on top of the member 80 and a second upwardly inclined end portion 162. A bolt 164 extends loosely through an aperture 166 at the junction between the portions 160 and 162 and loosely through an aperture 168 in the member 80. A nut member 170 is turned onto the bolt but not fully tightened so that the bolt and nut provide a pivotal connection between the member 156 and the member 80. The member 156 which is made from sufficiently heavy stock so as to be substantially rigid is normally but yieldably retained in the position shown in FIG. 8 by a spring 172 acting between the underside of the member 80 and a nut 174 on another bolt 176 extending loosely through aligned apertures in the end portion 160 and the member 80.

The standard or upstanding rod 152 extends freely through an aperture 178 in the member 80 and also through an aperture 180 in the upwardly inclined end portion 162 of the hanger member 156. The diameter of the aperture 180 is correlated with the diameter of the rod 152 so that when the end portion 160 is in its normal upwardly inclined position as shown in FIGS. 7 and 8, the opposite corners or edges 182 and 184 of the aperture 180 will bind on the threads of rod 152 and effectively secure the hanger member with respect to the rod and thereby support the side panel and bottom assembly at a desired adjusted position relative to the tube 30. This position may be easily changed by manually depressing the outer ends of the upwardly inclined portions of the hanger members so that the opposite edges of the hanger apertures are effectively disengaged from the upstanding rods or standards. When such disengagement is accomplished, the side panel and bottom assemblies may be easily shifted either upwardly or downwardly to the desired level. Of course, when the ends of the panel members are released they will again grip the standards for securing the side panel and bottom assembly in the desired adjusted position. In addition, fine adjustments may be easily obtained by turning the rods 152 and 154 so that the hanger members are raised or lowered on the threads.

Many occasions may arise when it is desirable to prevent feed from being dumped from one or more of the dispensing units. Therefore each of the units 36 with the exception of unit 36a is provided with means for locking its bottom or door member in a closed position and thereby preventing opening of the door member even when the previously described latch is actuated. This locking means is shown in FIGS. 4 and 5 and comprises a hook-like member 184 having a lower end adapted to engage beneath the flange 96 of an associated bottom or door member. An upper end portion of the hook member is releasably clamped against the side panel 76 by a screw element 186 having a clamping flange 188 thereon and engaging an internally threaded member 190 fixed on the inner side of the panel 76. Of course, the locking member 184 may be disengaged from the bottom or door by loosening the screw 186 a sufficient amount and then turning the locking member to a position such that the lower end thereof will not interfere with the door. The locking member may then be secured in the disengaged position by again tightening the screw member 186.

A control circuit and switches incorporated in the apparatus are shown in FIGS. 2, 3, and 12–15. A power line L–1 is connected by a wire 192 to one contact 200 of a terminal block 202. The contact 200 is connected with another terminal 204 from which wire 206 extends to a terminal 208 of a switch 210 in the switch-clock 134. The wire 206 is also connected with one terminal 212 of a motor 214 in the switch-clock. A second terminal 216 of the motor is connected by a wire 218 with terminal 220 on the block 202 which is connected with terminal 222 and wire 224 which extends to a power line L–2. The switch 210 of the switch-clock has additional contacts 226 and 228 which are respectively connected by wires 230 and 232 to a contact 234 of a switch 236 and to a contact 238 of the terminal block 202.

The contact 238 is connected with another contact 240 of the terminal block which is connected by wires 242 and 244 with additional contacts 246 and 248 of the switch 236. The switch has another contact 250 connected by a wire 252 with one terminal of the actuating motor unit 130 which has another terminal connected by wire 254 with the power line L–2 through the wire 224. Still another contact 256 of the switch 236 is connected by the wire 258 with a contact 260 of the terminal block which is connected with another contact 262 and wire 264 which extends to one terminal of the conveyor or auger driving motor 46. Another contact of the motor 46 is connected by wire 266 in series with switches 268 and 270 which in turn are connected by wire 272 to the power line L–2 through the terminal block 202. The switch 268 may be a mercury switch or of other known construction which is capable of being actuated by movement of a paddle or other suitable element as described more in detail below. This switch is located within the feed box portion of the dispensing unit 36a so that when this unit has been filled with feed to the desired level the switch 268 will be opened for deenergizing the motor 46.

Referring to FIGS. 2, 4, and 13–15, the endmost dispensing unit 36a differs from the upstream dispensing units in the provision of means for supporting and actuating the switch 268. More specifically, an open bottomed box-like support bracket 274 is welded or otherwise secured to the inner side of the end member 56 of the unit 36a and provides upstanding walls 276 and 278 and an end wall 280 spaced from the end member 56. The tube 30 extends through the end wall 280 and terminates adjacent thereto and at a location spaced substantially from the end member 56. In this dispensing unit, the bracket 66 is secured to the end wall 280 rather than the end member 56.

As shown in FIGS. 13, 14 and 15, a paddle member 282 is disposed between the side walls 276 and 278. The paddle member has a generally upstanding or vertical portion 284 and a laterally or generally horizontally extending portion 286. The paddle member is pivotally supported by a shaft 288 which extends between the end wall 280 and a bracket 290. The paddle member is connected with the shaft by bearing elements 292 and 294. A torsion spring 296 is connected between the end wall 280 and the paddle member for normally yieldably biasing the paddle member from the broken line position to the solid line position shown in FIG. 15.

The mercury switch 268 is mounted on and carried by the generally laterally or horizontally extending portion 286 of the paddle. The arrangement is such that when the paddle is in the solid line position shown in FIG. 15 the switch 268 is closed so as to permit energizing of the auger drive motor 46. It is seen that the lower portion 284 of the paddle is located at one side of the tube 30 so that when the auger is driven, a portion of the feed will be discharged from the end of the tube and will pile up against the lower end of the paddle. When the pile has built up to a predetermined level, or in other words, when the feed dispensing unit has been filled to a predetermined level, the pressure of the feed against the lower end of the paddle causes the paddle to move toward the broken line position shown in FIG. 15 for changing the position of the switch 268 and thereby opening the switch and deenergizing the auger drive motor 56.

The switch 270 is mounted on the side wall 76 of the dispensing unit 36a as shown in FIG. 2 for cooperative engagement with an abutment member 298 fixed to and movable with the latch member 102a. The arrangement is such that when the latch member 102a is in the door latching position with the door fully closed, the switch 270 will be closed for permitting the motor 46 to be energized. On the other hand, when the latch 102a is in a door opening position the switch 270 will be opened so as to prevent the motor 46 from being energized. Furthermore, it is to be noted that the latch member 102a is connected with all of the other latch members 102 by the cable 118 so that all of the latch members move in unison. Therefore, if any one of the latch members is in an open position or is prevented from fully returning to its closed or door latching position by its associated stop member 136, the switch 270 will remain open so that the motor 46 cannot be energized.

Operation of the feeder apparatus after all of the dumping units 36 have been initiately filled is as follows. At a predetermined time, the switch-lock 134 functions to energize the motor 130 of the actuator unit for rotating the crank 122 and thereby pulling the cable 118 for simultaneously shifting all of the latch members 102 and releasing the doors or bottom members 84. As the feed has been dispensed, the bottom members returned to their closed position, and the actuation of the latch members has been completed, the crank member 122 completes its portion of its cycle and engages lever 300 of switch 236. This engagement simultaneously deenergizes the motor 130 and energizes the circuit of the auger drive motor 46. The position of the crank member 122 would now be in the position shown in FIG. 12. Furthermore, as the crank 122 rotates to the position shown in FIG. 12, the counter weight 126 pulls the cable 118 and the latch members toward their original or starting positions. Furthermore, upon the dumping of the feed in the endmost or control dispensing unit 36a, the switch 268 automatically closes for permitting the motor 46 to be energized.

However, energization of motor 46 cannot take place until all of the latch members have returned completely to door or bottom member latching positions so that the switch 270 is closed as is described above. When all the switches 236, 268, and 270 are closed immediately after a dumping operation, the motor 46 is energized so that the dispensing units 36 are filled while the animals are still eating food which has been dispensed. After filling of the dispensing units is completed, the pressure actuated switch 268 opens and motor 46 is deenergized.

The switch-clock 134 is constructed so that after a predetermined interval, normally shortly after the auger motor 46 stops, the switch-clock switch 210 functions to change its circuit simultaneously deenergizing the auger motor 46 circuit and energizing the actuator motor 130, thus rotating crank 122 a small portion of a revolution until the crank disengages from lever 300 of switch 236. This disengagement from lever 300 deenergizes the actuator motor 130 thus resetting the actuating mechanism in preparation for the starting of the next feeding operation at a predetermined future time.

While a preferred embodiment of the present invention has been shown and described herein, it is obvious that many structural details may be changed without departing from the spirit and scope of the appended claims.

The invention is claimed as follows:

1. A feeder apparatus comprising longitudinally extending conveying means for delivering feed from a source of feed supply, a plurality of dispensing units mounted on and supported by said conveying means for receiving feed from said conveying means and subsequently dispensing the feed, each of said dispensing units including a container construction comprising end members mounted on said conveying means with a longitudinally extending section of said conveying means extending between said end members, opposite side members extending between said end members with the longitudinally extending section of said conveying means located intermediate said side members, said side members being movable relative to the longitudinally extending section of said conveying means to vary the amount of feed dispensed from the dispensing unit, and releasable bottom means for opening the container construction and dispensing the feed.

2. A feeder apparatus, as defined in claim 1, wherein each of said releasable bottom means comprises a bottom member hingedly connected to a lower margin of an associated side member, and counterbalancing means connected with said bottom member outwardly of said side panel for biasing said bottom member toward a closed position.

3. A feeder apparatus, as defined in claim 1, wherein said side panels and bottom means of each of said container constructions are vertically adjustable as a unit relative to said conveying means for adjusting the capacity of the container constructions.

4. A feeder apparatus comprising elongated conveying means including a driving motor for delivering feed from a source of feed supply, a plurality of dispensing units disposed along and connected with said conveying means for receiving feed from said conveying means and subsequently dispensing the feed, each of said units including a releasable closure member adapted to move between open and closed positions, each of said units including shiftable latch means selectively for retaining and releasing said closure members, and means connected with said latch means for permitting energizing of said motor when all of the latch means are in closure retaining positions and for preventing energizing of the motor when any one of said latch means is out of a closure retaining position.

5. A feeder apparatus, as defined in claim 4, wherein each of said latch means comprises an element projecting from an associated closure member, a pivotally supported latch member releasably engageable with said element, and said means connected with all of said latch means comprises an elongated element attached to all of said pivotally supported latch members.

6. A feeder apparatus, as defined in claim 5, wherein each of said latch means comprises a stop element shiftably supported adjacent an associated pivoted latch member for movement between extended and retracted positions, said stop element including a portion engageable with said latch member when the stop element is in said extended position for preventing the latch member from moving toward a closure member retaining position, and said stop element including a portion engageable with an associated closure member for shifting the stop element to the retracted position for avoiding engagement with the latch member when the closure member is in a fully closed position.

7. A feeder apparatus comprising conveying means including an elongated tube and a helical auger therein for delivering feed from a source of feed supply, an electric motor operatively connected with said auger for driving said auger, a plurality of dispensing units disposed along and connected with said tube means for receiving feed from said conveying means and subsequently dispensing the feed, each of said dispensing units comprising a container construction, said tube means including openings therein in alignment with said container construction for delivering feed into said container constructions at a predetermined level, each of said container constructions comprising opposite end members fixed to and supported on said tube means, a pair of side members extending between said end members and a bottom member pivotally connected to one of said side members, means supporting said side members and said bottom members for vertical adjustment relative to said end members and to said tube means for adjusting the capacity of said container constructions, each of said dispensing units comprising a shiftable latch member for releasably retaining a bottom member and shiftable between bottom retaining and releasing positions, an elongated element connecting all of said latch members, means for actuating said element in one direction for actuating said latch members and releasing said bottom members, means for actuating said element in an opposite direction for shifting said latch members to bottom member retaining position, and means connected with said motor and responsive to movement of latch members for energizing the motor when all said latch members are in bottom member retaining positions and for preventing energizing of the motor when any of said latch members is out of its door retaining position.

8. A feeder apparatus, as defined in claim 7, which includes means associated with one of said container constructions and connected with said motor for preventing energizing of the motor when said one container construction is filled with feed.

9. A feeder apparatus comprising elongated conveyor means for delivering feed from a source of supply, a plurality of dispensing units disposed along and connected with said conveying means for receiving feed from said conveying means and subsequently dispensing the feed, each of said dispensing units including means defining a dispensing opening of predetermined size and shape for directing feed being discharged in a predetermined pattern, each of said units including a releasable closure covering said opening, each of said units including a latch mechanism releasably retaining the closure in a closed position, said apparatus including means connected with said latch mechanisms for simultaneously actuating the latch mechanisms for permitting opening of all of said closures, said apparatus also including a motor connected with said conveying means for driving the conveying means, and means connected with said latch mechanisms for preventing operation of said motor until all of the latch mechanisms are in a closure retaining position, and each of said units including means independent of said opening defining means and said closure for adjusting the amount of feed to be dispensed.

10. A feeder apparatus, as defined in claim 9, wherein each of said units includes means for preventing the latch mechanism from assuming a closure retaining position until said closure is in a fully closed position.

11. A feeder apparatus comprising elongated conveyor means for delivering feed from a source of supply, a plurality of dispensing units disposed along and connected with said conveying means for receiving feed from said conveying means and subsequently dispensing the feed, each of said dispensing units including means defining a dispensing opening of predetermined size and shape for directing feed being discharged in a predetermined pattern, each of said units including a releasable closure covering said opening, each of said dispensing units including a latch mechanism releasably retaining the closure in a closed position, said apparatus including means connected with said latch mechanisms for simultaneously actuating the latch mechanisms for permitting opening of all of said closures, said apparatus further including releasable locking means associated with each of said units except a control unit in addition to said latch mechanism and selectively engageable with an associated closure for preventing opening of said closure when the associated latch mechanism is released, and each of said units including means independent of said opening defining means and said closure for adjusting the amount of feed to be dispensed.

12. A feeder apparatus, as defined in claim 11, wherein said conveying means comprises an elongated tube, and each of said units comprises a feed receiving container construction mounted on said tube, said tube having feed discharging opening means therein in association with each of said container constructions.

13. A feeder apparatus, as defined in claim 12, which includes overhead means connected with and suspending said tube and units above a floor.

14. A feeder apparatus comprising a storage bin for containing a supply of feed, an elongated conveyor means for delivering feed from said storage bin, said conveyor means comprising elongated tube means communicating with and extending from the lower end of said storage bin, an elongated flexible axially resilient auger extending through said tube means, means anchoring an upstream end of said tube means adjacent said lower end of the storage bin, drive means connected with and anchoring a downstream end of said auger, a plurality of dispensing units disposed along and connected with said conveyor means for receiving feed from said conveyor means and subsequently dispensing the feed, each of said dispensing units including means defining a dispensing opening of predetermined size and shape for directing feed being discharged in a predetermined pattern, each of said units including a releasable closure covering said opening, and each of said units including means independent of said opening defining means and said closure for adjusting the amount of feed to be dispensed.

15. In a feeder apparatus, a dispensing unit adapted to be connected with means for delivering feed thereto for receiving the feed and subsequently dispensing the feed, said unit comprising a container including opposite end members, a pair of opposite side members extending between and vertically adjustable relative to said end members, a releasable bottom member extending between lower margins of said side members and shiftable to an open position for dispensing feed, and means adjustably supporting said side members and said bottom member for vertical adjustment relative to said end members for varying the capacity of said container, said means adjustably supporting said side and bottom members comprising an upstanding rod, a hanger member interconnected with said side members and including an inclined portion, said inclined portion of the hanger member having an aperture therethrough defined by opposite edges engaging said rod for preventing downward movement of the hanger member and the side and bottom members relative to said rod, said hanger member portion being depressible from said inclined position for effectively disengaging said edges from said rod and permitting vertical adjustment of the side and bottom members.

16. In a feeder apparatus, a dispensing unit for receiving feed, means for delivering feed into said dispensing unit at a predetermined level, said dispensing unit including means defining a dispensing opening in a lower side thereof, a bottom member releasably traversing said opening and shiftable to an open position for dispensing the feed, means connected with the bottom member and biasing said bottom member toward a closed position, a shiftable latch member interengageable with said bottom member for releasably retaining the bottom member in a closed position, said latch member being shiftable between a bottom member retaining position and a releasing position, a stop member shiftably disposed for movement between extended and retracted positions in response to movements of the bottom member for restraining the latch member against movement to the retaining position until said bottom member is in a substantially fully closed position, and means for adjusting the elevation of said bottom member with respect to said predetermined level for varying the capacity of said dispensing unit.

17. A feeder apparatus comprising longitudinally extending conveyor means for transporting feed from a source of supply; and a plurality of dispensing units connected to said conveyor means for receiving feed from said conveyor means and subsequently dispensing the feed, each of said dispensing units including a pair of transversely extending side walls connected to said longitudinally extending conveyor means, a pair of longitudinally extending side walls mounted in engagement with said pair of transversely extending side walls, a longitudinally extending section of said conveyor means being located between said pair of longitudinally extending side walls for delivering feed to the dispensing unit, and a releasable bottom means mounted in engagement with said pair of longitudinally extending side walls, said pair of longitudinally extending side walls and said bottom means being movable relative to the section of conveyor means while maintaining the section of conveyor means between said longitudinally extending pair of side walls to adjust the volume of feed delivered to the dispensing unit.

18. A feeder apparatus as set forth in claim 17 wherein: each of said dispensing units includes adjustable mounting means connecting said pair of longitudinally extending side walls to said longitudinally extending conveyor means.

19. A feeder apparatus as set forth in claim 18 which includes overhead means connected to at least one side wall of said first pair of side walls of a plurality of said dispensing units to suspend said conveyor means and said dispensing units above a floor.

20. A feeder apparatus as set forth in claim 17 wherein: each of said releasable bottom means includes a bottom member hingedly connected to a lower margin of an associated one of said pair of longitudinally extending side walls, and counterbalancing means connected to said bottom member for biasing said bottom member toward a closed position.

21. A feed dispensing unit for use with a feed conveyor, said dispensing unit comprising a container defined by a plurality of side walls and a bottom means, said bottom means being mounted on a first one of said plurality of side walls for pivoting movement from a closed position adjacent to a second one of said plurality of side walls to an open position spaced apart from the second side wall to enable feed to be emptied from the dispensing unit; biasing means connected to said bottom means for urging said bottom means toward the closed position; a latch lever mounted on said second side wall, said latch lever being pivotal from a first position engaging said bottom means to hold said bottom means in the closed position to a second position; and a stop member mounted on the second side wall, said stop member being movable from a blocking position preventing movement of said latch lever from the second position to the first position to a normal position permitting the latch lever to move from the second position to the first position, said stop member being moved from the blocking position to the normal position by the pivoting of said bottom means from the open position to the closed position by said biasing means.

22. A feed dispensing unit as set forth in claim 21 wherein said stop member includes a first section positioned for engaging said latch lever when said stop member is in the blocking position, and a second section extending in an angular relationship with said first section, said second section being engaged by said bottom means to move said stop member from the blocking position to the normal position in which said first section is spaced apart from the latch lever to enable the latch lever to move to the first position from the second position.

References Cited

UNITED STATES PATENTS

| 3,144,173 | 8/1964 | France et al. | 119—56 X |
| 3,184,109 | 5/1965 | Brackett | 222—56 |
| 3,211,339 | 10/1965 | Piper et al. | 119—56 |
| 3,230,933 | 1/1966 | Myers et al. | 119—56 X |

FOREIGN PATENTS 977,206 12/1964 Great Britain.

ROBERT B. REEVES, *Primary Examiner.*

HADD S. LANE, *Examiner.*